(12) United States Patent
Dezonno et al.

(10) Patent No.: US 7,369,653 B2
(45) Date of Patent: May 6, 2008

(54) METHOD OF DELIVERING ENTERPRISE DATA THROUGH A CALL CENTER

(75) Inventors: Anthony Dezonno, Bloomingdale, IL (US); Jeffrey Hodson, Wheaton, IL (US); Joseph Bloom, Libertyville, IL (US); David Funck, Wheaton, IL (US); Eric James, Elgin, IL (US); Michael Peters, Downers Grove, IL (US); Mark J. Power, Carol Stream, IL (US); Craig R. Shambaugh, Wheaton, IL (US); Dave Mosquera, West Chicago, IL (US); Nayel Saleh, Round Lake, IL (US)

(73) Assignee: Rockwell Electronic Commerce Corp., Wooddale, IL (US)

( * ) Notice: Subject to any disclaimer, the term of this patent is extended or adjusted under 35 U.S.C. 154(b) by 677 days.

(21) Appl. No.: 10/011,578

(22) Filed: Nov. 5, 2001

(65) Prior Publication Data

US 2003/0086553 A1 May 8, 2003

(51) Int. Cl.
*H04M 3/00* (2006.01)
*H04M 5/00* (2006.01)

(52) U.S. Cl. .............................. 379/265.02; 379/265.01
(58) Field of Classification Search ........... 379/265.02, 379/265.01, 269, 265.09, 215.01, 201.02, 379/265.1, 266.06, 266.01; 455/456.2; 705/26

See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,383 A * | 12/2000 | Henson | 705/26 |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,272,216 B1 * | 8/2001 | Vaios | 379/265.01 |
| 6,311,231 B1 * | 10/2001 | Bateman et al. | 379/265.09 |
| 6,345,305 B1 | 2/2002 | Beck et al. | |
| 6,373,836 B1 | 4/2002 | Deryugin et al. | |
| 6,389,007 B1 | 5/2002 | Shenkman et al. | |

(Continued)

*Primary Examiner*—Thjuan K. Addy
(74) *Attorney, Agent, or Firm*—Welsh & Katz, Ltd.

(57) ABSTRACT

A method and apparatus are described for providing enterprise information to a client through a call center of the enterprise. The method includes the steps of detecting an identity of the client based upon call associated information received through a call connection between the client and the call center, presenting the client with a plurality of options based upon the identity of the client and presenting the client with enterprise information based upon a selected option of the plurality of options.

36 Claims, 5 Drawing Sheets

U.S. PATENT DOCUMENTS

| | | |
|---|---|---|
| 6,393,015 B1 | 5/2002 | Shtivelman |
| 6,430,174 B1 * | 8/2002 | Jennings et al. ............ 370/352 |
| 6,704,412 B1 * | 3/2004 | Harris et al. ................ 379/269 |
| 6,732,156 B2 | 5/2004 | Miloslavsky |
| 6,751,306 B2 * | 6/2004 | Himmel et al. ........ 379/201.02 |
| 6,879,836 B2 * | 4/2005 | Nakamoto et al. ....... 455/456.2 |
| 2002/0146106 A1 * | 10/2002 | Himmel et al. ........ 379/215.01 |

* cited by examiner

FIG. 5

| ORDER DATE | ORDER ID | SHIP DATE |
|---|---|---|
| 9/15/01 | XX | 9/16/01 |
| 9/02/01 | XX | 9/15/01 |
| ⋮ | ⋮ | ⋮ |
| 1/02/01 | XX | 2/01/01 |
| ↑ 162 | ↑ 164 | ↑ 166 |

| PAYMENT RECEIVED | AMOUNT |
|---|---|
| XX/XX/01 | $X.XX |
| ⋮ | ⋮ |
| XX/XX/01 | $X.XX |
| ↑ 182 | ↑ 184 |

↑ 180

US 7,369,653 B2

METHOD OF DELIVERING ENTERPRISE DATA THROUGH A CALL CENTER

FIELD OF THE INVENTION

The field of the invention relates to communication systems and more particularly to call centers.

BACKGROUND OF THE INVENTION

Call-centers are generally known. A call-center is typically used wherever a large number of calls must be handled for some common enterprise. Typically, the calls of the enterprise are routed through the call-center as a means of processing the calls under a common format.

Call-centers typically include at least three elements: an automatic call distributor (ACD), a group of agents for handling the calls, and a host computer containing customer information. The agents are each typically provided with a telephone console and a computer terminal. The telephone terminal receives customer calls distributed to the agent by the ACD. The terminal may be used to retrieve customer records from the host.

Call-centers are typically automated in the delivery of calls to agents and in the retrieval of customer records for use by agents. Features within the PSTN such as dialed number identification service (DNIS) and automatic number identification (ANI) may be used to determine not only the destination of the call, but also the identity of the caller. DNIS and ANI, in fact, may be delivered by the PSTN to the ACD in advance of call delivery.

Based upon the destination of the call and identity of the caller, the ACD may select the agent most qualified to service the call. By sending an identifier of the selected agent along with the identity of the caller to the host, the agent may retrieve and download customer records to the agent's terminal at the same instant as the call arrives.

While call-centers are effective, they are still overly dependent upon the interaction of agents with customers. Accordingly, a need exists for a better way in which customers can get information from a call center.

SUMMARY

A method and apparatus are described for providing enterprise information to a client through a call center of the enterprise. The method includes the steps of detecting an identity of the client based upon call associated information received through a call connection between the client and the call center, presenting the client with a plurality of options based upon the identity of the client and presenting the client with enterprise information based upon a selected option of the plurality of options.

BRIEF DESCRIPTION OF THE DRAWINGS

FIG. 5 is a shipping information web page that may be provided by the system of FIG. 1;

FIG. 6 is a payments web page that may be provided by the system of FIG. 1;

DETAILED DESCRIPTION OF AN ILLUSTRATED EMBODIMENT

Figure 1:
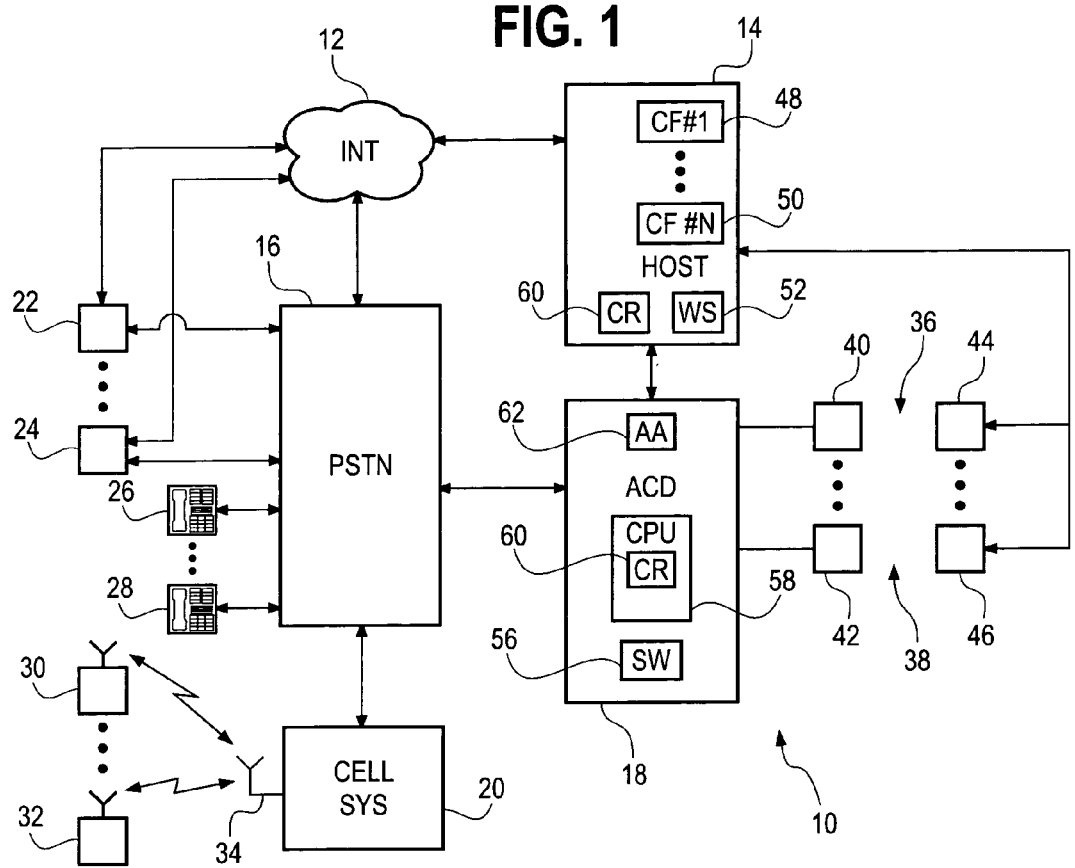
FIG. 1 is a block diagram of a call processing system in accordance with an illustrated embodiment of the invention.

FIG. 1 is a block diagram of a call processing system 10 shown generally in a context of use and in accordance with an illustrated embodiment of the invention. Under the illustrated embodiment, calls may be received from, or placed to, clients 22, 24, 26, 28, 30, 32 under any of a number of different formats. As used herein, a client may be a customer of the organization seeking account information, or an employee of the organization seeking information about the organization or about the call center. More particularly, a client of the call center is a human who relies upon the call center for information from the enterprise supported by the call center.

Voice calls may be processed through the PSTN 16 using a conventional audio channel and plain old telephone service (POTS) telephones 26, 28. Alternatively voice calls may be routed between a terminal 22, 24 of a client and the call center through the Internet 12 under a voice-over-IP (VOIP) format. Alternatively, a call may simply be a customer 22, 24 accessing a web site 52 of the call processing center 10 through the Internet 12.

Turning first to FIG. 1, a description will be provided of the mechanisms of client interaction with the call processing system 10. Following a description of the interaction, an explanation will be provided of how that interaction may be modified to present enterprise information not available to the general public to the client without the participation of an enterprise agent.

The call processing center 10 may include an ACD 18, a host 14 and a number of agents, each working though an agent station 36, 38. Each agent station 36, 38 may include a conventional telephone console 40, 42 and a computer terminal 44, 46.

The host 14 may include a web site 52 and a data base of client records 48, 50. As the agents converse with clients 22, 24, 26, 28, 30, 32, the agents (or supervisory personnel may access and modify a client's records 48, 50 through an associated terminal 44, 46).

In the case of voice calls, a caller (e.g., a customer using a convention telephone) 26, 28 may place a call to the call processing system 10. The PSTN 16 may route the call to the ACD 18 of the call processing system 10 along with certain types of call associated information. Call associated information may include DNIS information including a telephone number dialed by the caller and ANI information including the caller's identity. DNIS and ANI are both services provided by the PSTN 16.

Outbound calls may be initiated by the call processing system 10. A list of contacts (and contact information) may be maintained within the host 14. The host 14 may transfer telephone numbers to the ACD 18 at a rate intended to partially or fully occupy a staff of agents 36, 38. Call associated information, in this case, may simply be the contact information maintained within contact files located within the host 14.

Upon arrival at the ACD 18, the call may be detected at a port of a matrix switch 56. In the case of inbound calls, call associated information may be delivered by the PSTN 16 to a CPU 58 of the ACD 18. As a preliminary step, the CPU 58 may create a call record 60 for purposes of tracking the call. The call record may include the call associated information delivered along with the call.

The CPU 58 may send the call record 60 to the host 14 as a shared file. The host 14 functioning as a connection analyzer may access the customer's records 48, 50 using the identifier of the customer from the call associated information and retrieve caller preferences (favorite agent, frequently purchased products, most recently purchased product, etc.). The host 14 may append a list of the customer preferences to the call record 60 and send the record 60 back to the CPU 58 of the ACD 18.

Based upon the contents of the call file 60, the CPU 58 may select an agent to handle the call. Upon selection of an agent, the CPU 58 may notify the host 14 of the identity of the agent selected. In response, the host 14 may transmit the customer records to the selected agent. The customer records from the host 14 may appear as a screen pop on the terminal 44, 46 of the agent at the instant the call arrives.

Alternatively, if an agent is not available, the call may placed in a call queue or be routed by the CPU 58 to an auto-attendant (AA) 62. The AA 62 may orally provide the caller with a series of menu options. The caller may choose options by providing simple voice responses (e.g., YES, NO, etc.) or by activating touch-tone keys on his telephone. The AA 62 may decode any simple responses using voice recognition or the AA 62 may use tone recognition to decode any detected touch-tones. The decoded responses may be added to the call record 60 as additional call associated information and may be used to further improve routing efficiency of the call.

As an alternative to a telephone call delivered through the PSTN 16, a caller 22, 24 may access the web site 52 through the Internet 12. To access the web site 52, the customer 22, 24 may enter a universal resource locator (URL) of the web site 52 into his browser and transmit an access request packet to the web site 52.

Within the host 14, the packet arriving from the customer 22, 24 may be decoded both to deliver the packet to the web site 52 and also to recover the source URL of the sender 22, 24. The host 14 again functioning as a connection analyzer may access the customer record files 48, 50 and identify the caller 22, 24 using the caller's URL. Upon identifying the caller, 22, 24, the host 14 may retrieve the customer's preferences and a most recent buying records.

The host 14 may also create a call record 60 to track the call. The call file may include the URL or some other identifier of the caller, an identifier of the web site 52 and any web page visited. Information entered by the caller into any interactive windows on a web page may also be stored within the call file.

As with voice calls, information collected and entered into the call record 60, without the participation of an agent, becomes call associated information. In general, and as used herein, call associated information means a URL of the caller, ANI or DNIS information or any other information given by the client through the call connection without participation of an agent either orally or manually using a keypad, mouse, softkeys or keyboard.

Figure 2:
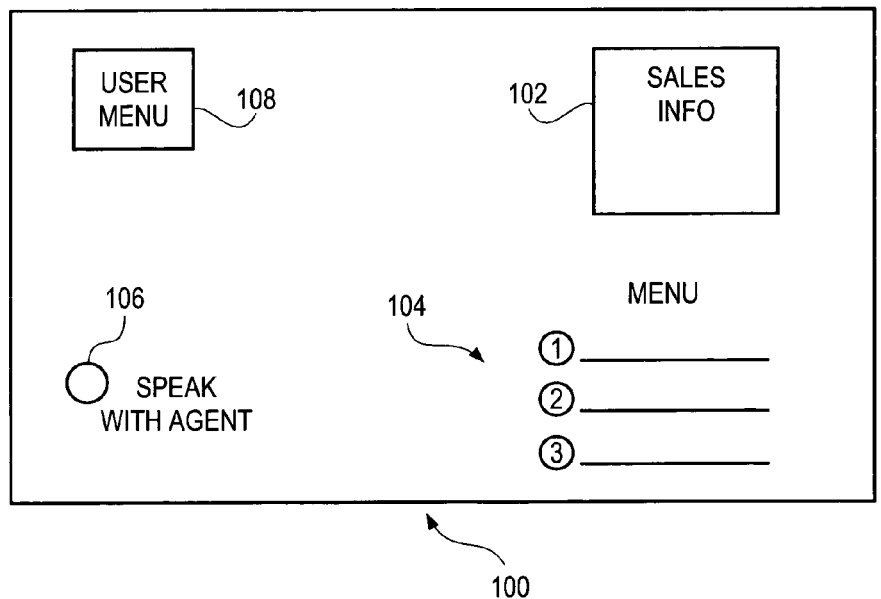
FIG. 2 is a preliminary access web page that may be provided by the system of FIG. 1.

Upon decoding of the packet, the web site 52 may return a web page 100 (FIG. 2) to the caller 22, 24. Included within the web page 100 may be sales information 102, menu selections 104 to obtain further information and also a softkey 106 for voice access to an agent 36, 38 in the event the caller wishes to place an order or to ask a question.

If the caller 22, 24 should activate the softkey 106 requesting access to an agent, then the host 14 may send an agent request (including the call file 60) to the CPU 58 of the ACD 18. The agent request may include a subject matter of the web page 100 as well as customer preferences.

Upon receiving the agent request, the CPU 58 of the ACD 18 may first determine which agents are available and then which of the available agents is best suited to answer the call. The CPU 58 may determine which agents are available to receive a call by identifying any agents whose telephone 40, 42 is on-hook.

In addition, the CPU 58 may access an agent training list to determine which, if any, agent is qualified to answer a question regarding the web page from which the request originated. If an agent is identified, the CPU 58 transfers an identifier of the selected agent to the host 14. The CPU 58 may also mark the selected agent as occupied to avoid assigning any further calls to the selected agent until the current call is complete.

Upon receiving the identifier of the selected agent, the host 14 may transfer the URL of the caller 22, 24 to the selected agent along with instructions to activate a VOIP application within the agent's terminal 44, 46. The host 14 may also transfer any customer records 48, 50 to the terminal of the selected agent for display during call set-up.

In order to enhance the value of client contacts, the call processing system 10 may retrieve and present enterprise information to a caller based upon the identity of the caller and upon a set of business rules established by the organization that uses the call processing system 10. The business rules may be based upon any model appropriate to the organization (e.g., customers may access their own buying records, employees may access their own performance records, call center supervisors may access call center records, etc.).

In general, the enterprise information presented to the client may be based upon a relationship and a prior history of interaction of the client with the call processing system 10. Further, presentation of the enterprise information may be based upon menu presentation and selection that is, in turn, based upon the relationship of the client with the call processing center 10.

In order to determine the client relationship with the call center, call associated information may be used to determine an identity of the client. Alternatively, access to enterprise information may be based exclusively upon ANI or source URLs, with additional security based upon PINs. From the identity, a predetermined menu may be presented allowing the client to choose from any of a number of options.

Figure 4:
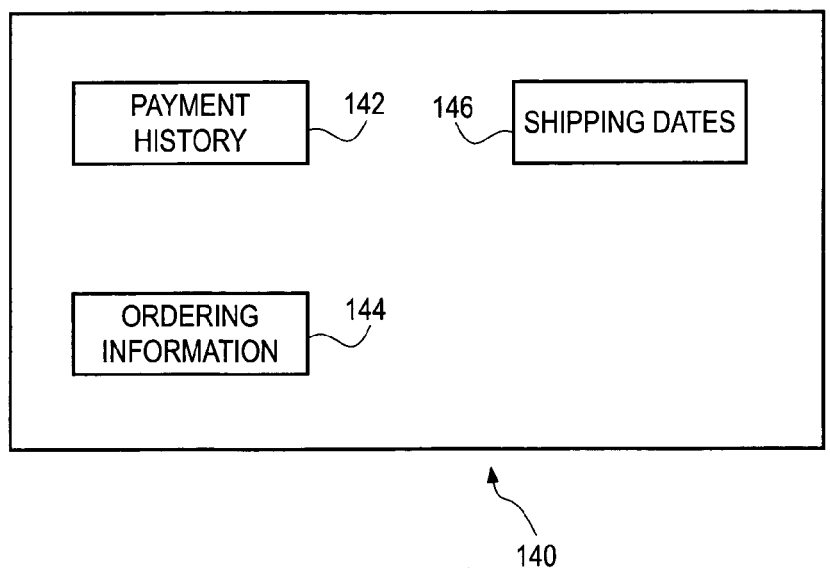
FIG. 4 is an account access web page that may be provided by the system of FIG. 1.

In the case of a customer 22, 24 accessing the system 10 through the website 52, the customer 22, 24 may access enterprise information in a number of ways. For example, in the case of the web page 100, the customer 22, 24 may activate a USER MENU softkey 108 to access a menu 140 (FIG. 4).

Alternatively, the customer 22, 24 may activate a SPEAK WITH AGENT softkey 106. Upon activating the SPEAK WITH AGENT softkey 106, the host 14 may transfer a call record 60 to the CPU 58. The CPU 58 may select and return an identifier of an agent 36, 38 using the information found within the call record 60, including past purchases, preferences and knowledge of the agents 36, 38.

Figure 3:
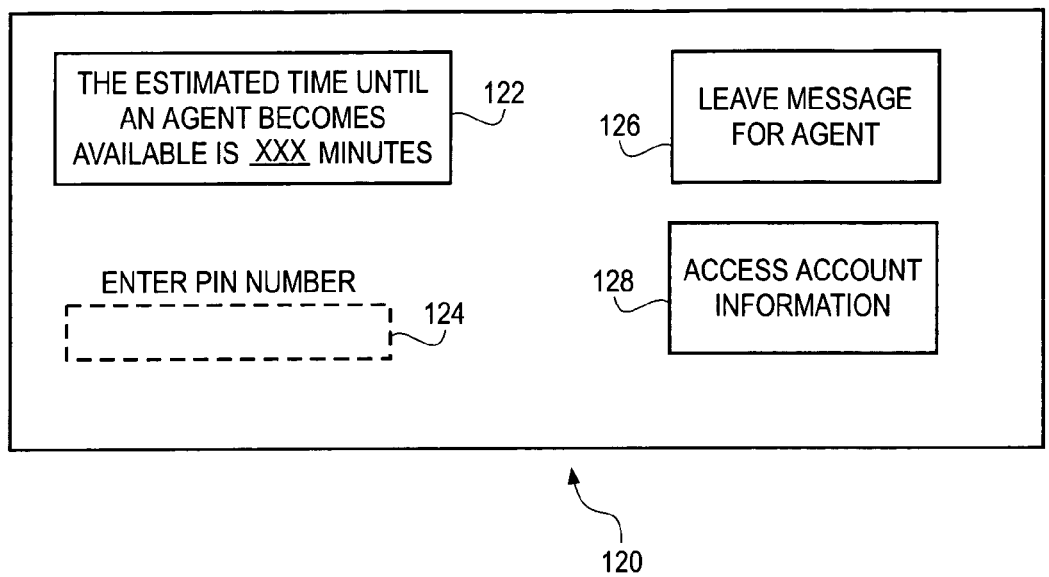
FIG. 3 is an agent access web page that may be provided by the system of FIG. 1.

Upon selection of the agent 36, 38, the customer 22, 24 may be connected directly with an agent 36, 38, as discussed above. However, if the agent is occupied by a prior call, or no agents are available, then the menu 120 of FIG. 3 may be returned to the customer 22, 24.

The menu 120 may include a display 122 showing an estimate of time until the selected agent 36, 38 becomes available or the number of customers ahead of the caller. Menu options also available to the customer 22, 24 (as the customer waits) may include a LEAVE MESSAGE FOR AGENT softkey 126 and an ACCESS ACCOUNT INFORMATION softkey 128. An interactive window 124 may also be provided for entry of an optional personal identification number (PIN).

The customer 22, 24 may wait until the selected agent 36, 38 becomes available or select another option. If the customer 22, 24 should select the LEAVE MESSAGE FOR AGENT option 126, then a message may be recorded and send to the selected agent 36, 38 using conventional methods.

The customer 22, 24 may leave a message or, alternatively, select the ACCESS ACCOUNT INFORMATION softkey 128. Upon selecting the ACCESS ACCOUNT INFORMATION softkey 128, the customer 22, 24 may be taken to the menu 140 of FIG. 4.

The menu 140 may provide a number of predetermined options relating to the relationship of the organization with the customer 22, 24. One option may involve the retrieval of a payment history based upon activation of a PAYMENT HISTORY softkey 142. Another option may include retrieval of shipping dates based upon activation of a SHIPPING DATES softkey 146. A final option may be the retrieval of ordering information based upon activation of an ORDERING INFORMATION softkey 144.

Upon activation of the PAYMENT HISTORY softkey 142, a payment history 180 (FIG. 6) of the customer 22, 24 may be retrieved by the host 14 from customer files 48, 50. Included within the payment history may be a date of each payment 182 and payment amount 184 received from the customer 22, 24.

Alternatively, the customer 22, 24 may activate a SHIPPING DATES softkey 146. In response, a web page 160 (FIG. 5) may be retrieved from files 48, 50. Included within the shipping dates web page 160 may be an order date 162, order identifier 164 and a shipping date 166 for each order.

The order identifier 164, in turn, may each be provided in the form of another softkey. Activation of an order identifier softkey may result in retrieval of details of the content of each order.

Figure 7:
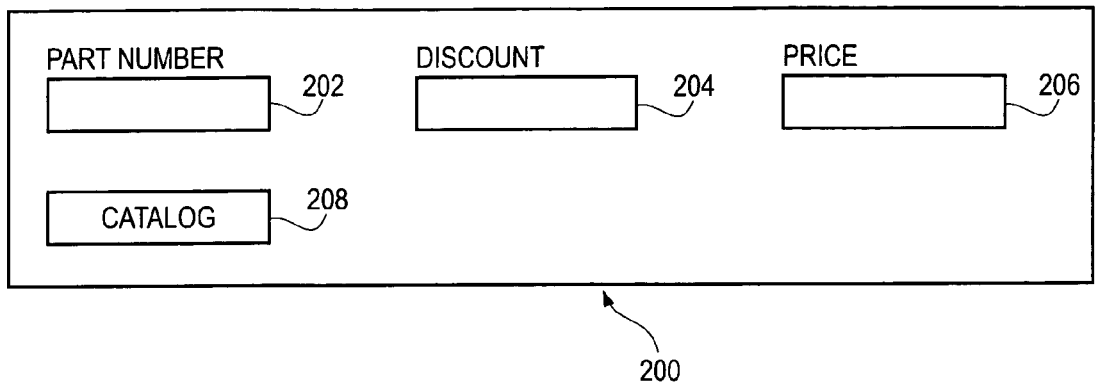
FIG. 7 is an ordering information web page that may be provided by the system of FIG. 1.

Alternatively, the customer 22, 24 may activate the ORDERING INFORMATION softkey 144 and be taken to the web page 200 (FIG. 7). Using the web page 200, the customer 22, 24 may enter part numbers in a first window 202. Based upon entry of parts numbers, the host 14 may retrieve and display a customer's discount in a second window 204 and the customer's price in another window 206. A CATALOG softkey 208 may also be provided for the convenience of the customer 22, 24 in retrieving part numbers.

In another example, a customer 26, 28 may place a call to the system 10 on a POTS line when all agents 36, 38 are occupied with prior callers. The CPU 58 may receive the call and route the call from the customer 26, 28 to the AA 62.

From the call associated information, the CPU 58 may retrieve customer records 48, 50 defining a relationship with the customer 26, 28.

From the records 48, 50, the CPU 58 may retrieve and orally present a menu of options through the AA 62 regarding enterprise information that may optionally be accessed by the customer 26, 28 based upon menu selections. The CPU 58 may also identify the agent 36, 38 that is the most qualified to handle the call based upon the retrieved customer records.

As a preface to presentation of the options, the AA 62 may recite an estimated time until the identified agent 36, 38 becomes available. As one of the options, the AA 62 may ask the customer 26, 28 if he wants to leave a voice mail message for the identified agent. Alternatively, the AA 62 may ask the customer 26, 28 if he wants to access his account information.

If the customer 26, 28 responds affirmatively (e.g., with a "YES" to the query about access to account information), by stating "ACCOUNT INFORMATION", etc.) the AA 62 may respond by asking what type of account information is desired. Options may include payment history, shipment dates or ordering information.

If the customer responds with a request for ordering information, the AA 62 may ask for a part number. When the customer 26, 28 responds with a valid part number, the AA 62 may respond with a price, including any discounts, available to the identified customer 26, 28 and an estimated delivery time based upon past customer shipping preferences.

If the customer 26, 28 should select payment history, then the AA 62 may retrieve such information from the host 14 and respond with an amount and date of a most recent payment received from the customer 26, 28. If the customer 26, 28 is overdue in his account the AA 62 may ask the customer 26, 28 if he wishes to speak to an account manager or whether he wishes to make a payment using a credit card. If the customer 26, 28 responds affirmatively, the AA 62 may collect a credit card name, number and payment amount or simply inquire whether a payment is to be taken from a previously used credit card or debit account.

If the customer 26, 28 selects shipping dates, then the AA 62 may retrieve outstanding orders from the customer files 48, 50. Shipment dates of previously ordered items may be recited based upon the next item to be shipped and proceeding prospectively. Alternatively, the AA 62 may recite past orders by date or part number and upon receiving a response, may respond with a past or future shipping date based upon the response.

Figure 10:
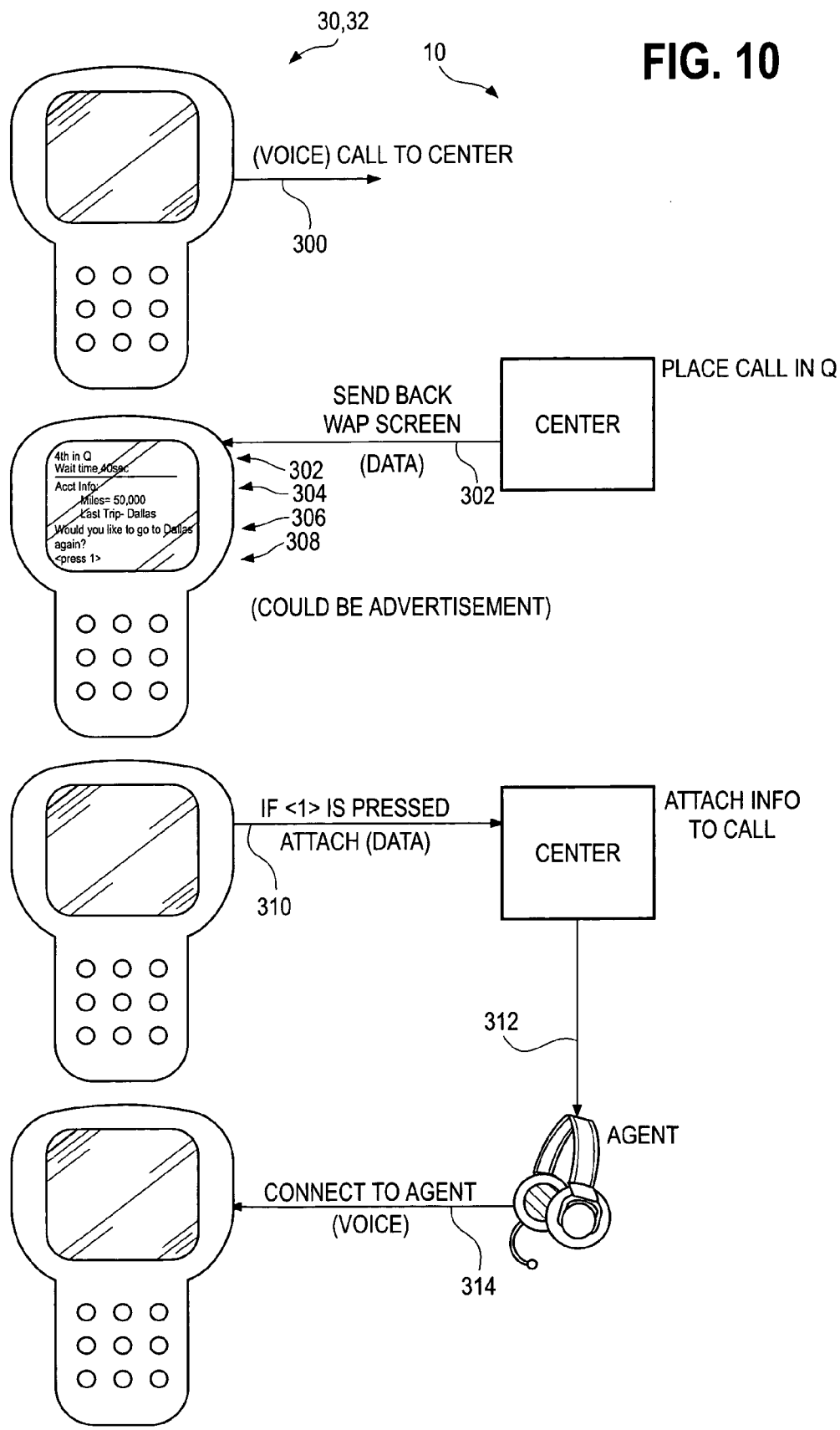
FIG. 10 is a bounce diagram between a cellular user and call processing system of FIG. 1.

In another illustrated embodiment, a cellular user may access the call processing system 10 using a cellular device with a display operating under a wireless application protocol (WAP) (e.g., a personal digital assistants (PDAs), a cellular telephone with display, etc.) 30, 32. FIG. 10 shows a bounce diagram that may be used to illustrate an information exchange between the client 30, 32 (on the left) and the call processing system 10 (on the right). As a first step, the cellular device 30, 32 may send a voice call request 300 to the call processing system 10.

The call processing system 10 may identify the caller based upon ANI and retrieve prior account information. In the case of an airline reservation system, the prior information may include miles traveled and information about a most recent trip.

From the retrieved information, the host 14 may compose and download a screen display of enterprise information for the benefit of the caller 30, 32. The information may include a number of the caller in a queue and an estimated time 302 before the call may be answered. The information may also include accumulated frequent flyer miles and a last trip destination 304.

The downloaded information may also include an inquiry about whether the caller 30, 32 desires to repeat 306 has last trip. Instructions 308 may also be provided (i.e., "PRESS 1") to select a repeat of his last trip.

In addition, the call associated information and recent buying history may be used to initiate the downloading of html documents included targeted advertising. The targeted advertising may be selected to most closely parallel the same or similar products to those purchased in the past. Music may be downloaded on the same basis.

If the customer 30, 32 should select a repeat of his last trip, an appropriate message 310 is sent back to the call processing system 10. The selection may be added to the customer records.

When the call arrives at the head of the queue, the customer information may be transferred 312 to an agent. At the same time that the information is provided to the agent, the call processing system 10 may also connect 314 the customer 30, 32 to the agent.

In another illustrated embodiment, the system 10 may be used to present enterprise information to a client who is an employee of the organization that controls and uses the system 10. For example, the client may be an organizational agent or a supervisor of organizational agents. In this case, the call center 10 recognizes the client by call associated information and allows the client to access enterprise information appropriate to the position of the client within the organization.

Under the illustrated embodiment, the organizational clients may be provided with wireless communication devices operating under a WAP (e.g., personal digital assistants (PDAs), cellular telephones with displays, etc.) 30, 32 or terminals 22, 24. The organizational clients may also access the system using POTS telephones 26, 28 where telephone access is limited (e.g., where the telephone 26, 28 is in the client's home or private office).

An organizational client 22, 24, 30, 32 with a display may access the website 52 using conventional methods. Where the client 30, 32 accesses the website 52 through the cellular telephone system 20, the host 14 may recognize from call associated information that the cellular device 30, 32 has a display and proceed accordingly.

The menu 100 may be downloaded as described above. To directly access enterprise information, the user may activate the USER MENU 108.

Figure 8:
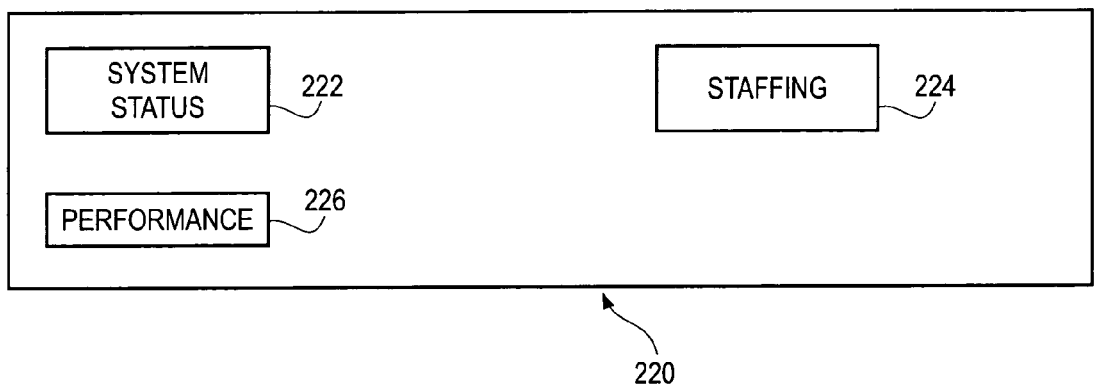
FIG. 8 is an organizational client web page that may be provided by the system of FIG. 1.

Upon receipt of the call, the host 14 may access the call associated data and recognize the call as being from an organizational client. Upon recognizing the caller as being an organizational client, the host 14 may download web page 220 (FIG. 8) or direct the caller to the web page 120 for the optional entry of a PIN number. A PIN may be required in the case of an organizational supervisor and where sensitive organizational information may be accessed.

Once reaching the web page 220, access may be further limited by the identity of the client. For example, a supervisor may be given access to system, staffing and performance information. An organizational agent, on the other hand, may only be given access to his own performance information and information relating his own performance to the performance of other agents.

For example, an organizational agent may be presented with statistics about that agent's most recent work shift. The statistics may include a work assignment, calls handled per hour in that assignment, total calls handled or average time per call. The statistics may also include the statistics of other agents in similar work assignments.

Figure 9:
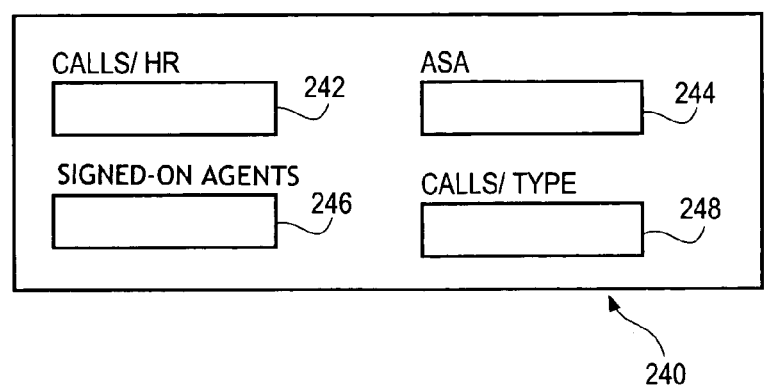
FIG. 9 is a system status web page that may be provided by the system of FIG. 1.

A supervising client may initiate a call to the call center 10 and also be presented with the organizational client web page 220. If the supervisor activates the SYSTEM STATUS softkey 222, he may be presented with the system softkeys 242, 244, 246, 248 of FIG. 9. By activating the CALLS/HOUR softkey 242, the supervisor may determine a system loading, in total, and for each work group. By activating an ASA softkey 244, the supervisor may determine a loading of each work group. By activating a SIGNED-ON AGENTS softkey 246, the supervisor may determine the total number of signed-on agents, in total, and by work group. By activating a CALLS/TYPE softkey, the supervisor may determine the number of calls per call type arriving at the call center 10.

If the supervisor should desire to determine the work assignments, then he may activate a STAFFING softkey 224. Upon activating the STAFFING softkey 224, the supervisor may be presented with the number of agents scheduled to work during each time period.

Based upon the use of call associated data, enterprise data may be distributed in a convenient, easy to access manner. Further, by using the call associated data in conjunction with other security features (e.g., PIN), the system 10 may be tailored to any security level of business rule capacity.

A specific embodiment of a method and apparatus for presenting enterprise information has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of providing enterprise information to a client through a call center of the enterprise, such method comprising:

providing a single channel call connection for establishing a communication session during inbound calls between the client and an agent of the call center;

detecting an identity of the client and a relationship of the client to the call center based upon call associated information received through the call connection between the client and the call center;

presenting the client with a plurality of options through the single channel call connection without participation of the agent wherein presentation of the options is determined by the identity of the client and by the relationship of the client with the call center; and presenting the client without participation of the agent with enterprise information not available to the general public through the call connection based upon a selected option of the plurality of options and based upon the relationship of the client and a prior history of interaction with the call center and limited to the enterprise information not available to the general public which is unique to the client and appropriate to the client's position within the enterprise.

2. The method of providing enterprise information as in claim 1 further comprising presenting the client with queuing information regarding an estimated time to assign an enterprise agent to the call connection.

3. The method of providing enterprise information as in claim 1 wherein the presented menu of options further comprises status of a pre-established client account.

4. The method of providing enterprise information as in claim 1 wherein the presented menu of options further comprises an estimated delivery date of a previously ordered enterprise product.

5. The method of providing enterprise information as in claim 1 further comprising accessing the call associated data to recognize the call as being from an organizational client and upon recognizing the organizational client, directing the caller to enter a PIN.

6. The method of providing enterprise information as in claim 1 wherein the presented menu of options further comprises instructions for leaving a message for an enterprise agent.

7. The method of providing enterprise information as in claim 1 wherein the presented menu of options further comprises status of the call center.

8. The method of providing enterprise information as in claim 7 wherein the presented menu of options further comprises average speed of answer of a call group.

9. The method of providing enterprise information as in claim 1 wherein the presented menu of options further comprises signed-on agents of a call group.

10. The method of providing enterprise information as in claim 1 wherein the presented menu of options further comprises average calls handled per time period for a call type.

11. The method of providing enterprise information as in claim 1 wherein the call associated information and recent buying history are used to initiate downloading of targeted advertising.

12. The method of providing enterprise information as in claim 1 wherein the call associated information further comprises an IP address which is used to detect the identity of the client and the relationship of the client to the call center and thereby determine presentation of the options.

13. The method of providing enterprise information as in claim 1 wherein the call associated information further comprises a personal identification number and wherein the method comprises presenting an interactive window to provide for entry of the personal identification number.

14. The method of providing enterprise information as in claim 1 further comprising converting the presented information into an audio presentation.

15. The method of providing enterprise information as in claim 1 further comprising converting the presented information into a screen display.

16. The method of providing enterprise information as in claim 1 further comprising formatting the information for delivery through an Internet connection.

17. The method of providing enterprise information as in claim 1 wherein the Internet connection further comprises a wireless interface.

18. An apparatus for providing enterprise information to a client through a call center of the enterprise, such apparatus comprising:
   means for providing a single channel call connection for establishing a communication session during inbound calls between the client and an agent of the call center;
   means for detecting an identity of the client and a relationship of the client to the call center based upon call associated information received through a call connection between the client and the call center;
   means for presenting the client with a plurality of options through the single channel call connection without participation of the agent wherein presentation of the options is determined by the identity of the client and by the relationship of the client with the call center; and
   means for presenting the client without participation of the agent with enterprise information not available to the general public through the call connection based upon a selected option of the plurality of options and based upon the relationship of the client and a prior history of interaction of the client with the call center and limited to non-public enterprise information unique to the client and appropriate to the client's position within the enterprise.

19. The apparatus for providing enterprise information as in claim 18 further comprising means for presenting the client with queuing information regarding an estimated time to assign an enterprise agent to the call connection.

20. The apparatus for providing enterprise information as in claim 18 wherein the presented menu of options further comprises status of a pre-established client account.

21. The apparatus for providing enterprise information as in claim 18 wherein the presented menu of options further comprises an estimated delivery date of a previously ordered enterprise product.

22. The apparatus for providing enterprise information as in claim 18 wherein the presented menu of options further comprises estimated delivery time of an enterprise product.

23. The apparatus for providing enterprise information as in claim 18 wherein the presented menu of options further comprises instructions for leaving a message for an enterprise agent.

24. The apparatus for providing enterprise information as in claim 18 wherein the presented menu of options further comprises status of the call center.

25. The apparatus for providing enterprise information as in claim 18 wherein the presented menu of options further comprises average speed of answer of a call group.

26. The apparatus for providing enterprise information as in claim 18 wherein the presented menu of options further comprises signed-on agents of a call group.

27. The apparatus for providing enterprise information as in claim 18 wherein the presented menu of options further comprises average calls handled per time period for a call type.

28. The apparatus for providing enterprise information as in claim 18 wherein the call associated information further comprises automatic number identification.

29. The apparatus for providing enterprise information as in claim 18 wherein the call associated information further comprises an IP address which is used to detect the identity of the client and the relationship of the client to the call center and thereby determine presentation of the options.

30. The apparatus for providing enterprise information as in claim 18 wherein the call associated information further comprises a personal identification number.

31. The apparatus for providing enterprise information as in claim 18 further comprising means for converting the presented information into an audio presentation.

32. The apparatus for providing enterprise information as in claim 18 further comprising means for converting the presented information into a screen display.

33. The apparatus for providing enterprise information as in claim 18 further comprising means for formatting the information for delivery though an Internet connection.

34. The apparatus for providing enterprise information as in claim 18 wherein the Internet connection further comprises a wireless interface.

35. An apparatus for providing enterprise information to a client through a call center of the enterprise, such apparatus comprising:
- a single channel call connection for establishing a communication session during inbound calls between the client and an agent of the call center;
- a call analyzer adapted to detect an identity of the client and a relationship of the client to the call center based upon call associated information received through the call connection between the client and the call center;
- a predetermined menu adapted to present the client with a plurality of options through the single channel call connection without participation of the agent wherein presentation of the options is determined by the identity of the client and by the relationship of the client with the call center and a prior history of interaction of the client with the call center; and
- a communication controller adapted to present the client without participation by the agent with enterprise information not available to the general public through the call connection based upon a selected option of the plurality of options and limited to the non-public enterprise information which is unique to the client and appropriate to the client's position within the enterprise.

36. The apparatus for providing enterprise information as in claim 35 further comprising means for presenting the client with queuing information regarding an estimated time to assign an enterprise agent to the call connection.

* * * * *